(12) United States Patent
Yuan (10) Patent No.: US 9,278,371 B2
(45) Date of Patent: Mar. 8, 2016

(54) HOT MELT APPARATUS

(71) Applicant: WISTRON CORP., New Taipei (TW)

(72) Inventor: Jia Yuan, New Taipei (TW)

(73) Assignee: WISTRON CORP., New Taipei (TW)

( * ) Notice: Subject to any disclaimer, the term of this patent is extended or adjusted under 35 U.S.C. 154(b) by 326 days.

(21) Appl. No.: 14/146,010

(22) Filed: Jan. 2, 2014

(65) Prior Publication Data
US 2015/0107778 A1 Apr. 23, 2015

(30) Foreign Application Priority Data
Oct. 21, 2013 (CN) .......................... 2013 1 0496383

(51) Int. Cl.
| | |
|---|---|
| *B32B 37/00* | (2006.01) |
| *B05C 5/02* | (2006.01) |
| *B29C 65/60* | (2006.01) |
| *B29C 65/64* | (2006.01) |
| *B29C 65/00* | (2006.01) |
| *B05B 1/30* | (2006.01) |

(52) U.S. Cl.
CPC ............. *B05C 5/0237* (2013.01); *B29C 65/605* (2013.01); *B29C 65/64* (2013.01); *B29C 66/21* (2013.01); *B29C 66/742* (2013.01); *B05B 1/3006* (2013.01); *B05B 1/3073* (2013.01)

(58) Field of Classification Search
CPC .... B05C 5/0237; B29C 65/605; B29C 65/64; B29C 66/21; B29C 66/742
USPC ....................................................... 156/499
See application file for complete search history.

(56) References Cited

U.S. PATENT DOCUMENTS

| | | | | |
|---|---|---|---|---|
| 5,924,607 A * | 7/1999 | Yamada | ................ | B05B 1/3046 222/146.2 |
| 7,626,143 B2 * | 12/2009 | Miller | .................... | B05C 5/001 219/421 |
| 8,069,653 B2 * | 12/2011 | Ganzer | ................ | B05C 5/0225 239/533.11 |
| 9,156,053 B2 * | 10/2015 | Tix | .......................... | B05C 11/10 |

FOREIGN PATENT DOCUMENTS

TW M459107 8/2013

* cited by examiner

*Primary Examiner* — James Sells
(74) *Attorney, Agent, or Firm* — CKC & Partners Co., Ltd.

(57) ABSTRACT

A hot melt apparatus includes main body, exhaust pin, stopping and resilient members. The main body has hot melt surface, first and second exhaust openings. The first exhaust opening is located on hot melt surface. The main body has channel and chamber. The chamber has abutting surface. The channel is communicated with first exhaust opening and abutting surface. The chamber is communicated with second exhaust opening. The exhaust pin is disposed in channel, and has a pinhead protruding from first exhaust opening and a pintail protruding into chamber. Stopping member is accommodated in chamber and connected to pintail. When the stopping member abuts against the abutting surface, the pinhead open the first exhaust opening. When the pinhead closes the first exhaust opening, the stopping member leaves the abutting surface. The resilient member is accommodated in the chamber for pushing the stopping member toward the abutting surface.

17 Claims, 7 Drawing Sheets

HOT MELT APPARATUS

RELATED APPLICATIONS

This application claims priority to Chinese Application Serial Number 201310496383.1, filed Oct. 21, 2013, which is herein incorporated by reference.

BACKGROUND

1. Technical Field

The present disclosure relates to a hot melt apparatus. More particularly, the present disclosure relates to a hot melt apparatus serves to melt a plastic material so as to form a hot melt head.

2. Description of Related Art

Currently, many parts of common consumer electronics on the market (such as mobile phones, computers, digital cameras) are made from plastic materials. In order to reduce product cost and at the same time make the products thinner, nowadays the connections between plastic parts and between plastic part and metal part are mostly formed through thermal welding.

For example, when a plastic part is welded to a metal part, the thermal fixing pillar of the plastic part first passes through the hole of the metal part corresponding to the thermal fixing pillar, then a hot melt process is performed to the thermal fixing pillar by a thermal melting apparatus. Since the hot melt surface of the hot melt apparatus is generally a concave surface, under normal circumstances, the hot melt head of the molten thermal fixing pillar thus formed is in a mushroom-head shape. After being cooled and solidifies, the hot melt head will be embedded in the hole of the metal part so that the plastic part can be firmly bonded to the metal part.

However, during the hot melt process, in which the hot melt surface is faced with the thermal fixing pillar, the hot melt surface and the thermal fixing pillar are in close contact with each other and air between the hot melt surface and the thermal fixing pillar is expelled. Therefore, a vacuum adsorption effect is formed between the hot melt surface and the hot melt head when the hot melt apparatus is moved away after the hot melt process is completed. Owing to the vacuum adsorption effect, the hot melt head has not completely solidified is possibly pulled. As a result, the hot melt head curved up or even falls off (that is, the whole hot melt head is pulled away) to cause weld failure problem.

For the forgoing reasons, there is a need for solving the above-mentioned problems by providing a hot melt apparatus, which is one of the subjects that the industry eagers to invest R&D resources in.

SUMMARY

A hot melt apparatus is provided. The hot melt apparatus comprises a main body, an exhaust pin, a stopping member, and a resilient member. The main body has a hot melt surface, a first exhaust opening, and a second exhaust opening. The first exhaust opening is located on the hot melt surface. The main body further comprises a channel and a chamber. The chamber has an abutting surface. The channel is communicated with the first exhaust opening and the abutting surface. The chamber is communicated with the second exhaust opening. The exhaust pin is slidably disposed in the channel. The exhaust pin has a pinhead and a pintail. The pinhead protrudes out of the first exhaust opening, and the pintail protrudes into the chamber. The stopping member is accommodated in the chamber and connected to the pintail. When the stopping member abuts against the abutting surface, the pinhead opens the first exhaust opening. When the pinhead closes the first exhaust opening, the stopping member leaves the abutting surface. The resilient member is accommodated in the chamber for pushing the stopping member toward the abutting surface.

In the foregoing, the main body has a first end and a second end opposite to each other. The first exhaust opening and the second exhaust opening are respectively located at the first end and the second end. The channel and the chamber are located between the first exhaust opening and the second exhaust opening.

In the foregoing, the stopping member is a stop nut. The pintail has an external thread. The external thread is threaded into the stop nut.

In the foregoing, when the pinhead closes the first exhaust opening, the pinhead and the hot melt surface are smoothly connected In the foregoing, the hot melt surface s substantially in a shape of an arc and recessed toward the second end.

In the foregoing, the exhaust pin slides relative to the channel along a sliding direction. When the pinhead closes the first exhaust opening, a first distance is formed between the stopping member and the abutting surface in the sliding direction. The first distance is from 0.05 millimeter to 0.3 millimeter.

In the foregoing, the pinhead has a pin tip extending away from the pintail. When the stopping member abuts against the abutting surface, a second distance is formed between the pin tip and an outer edge of the hot melt surface in the sliding direction. The second distance is smaller than 0.3 millimeter.

In the foregoing, the channel has a countersunk hole. The countersunk hole is adjacent to the first exhaust opening. The pinhead has a tapered portion. A diameter of the tapered portion gradually decreases toward the pintail. A shape of the countersunk hole conforms to a shape of the tapered portion. When the pinhead closes the first exhaust opening, the tapered portion tightly closes the countersunk hole.

In the foregoing, the chamber further comprises an internal thread extending to the second exhaust opening. The hot melt apparatus further comprises a thread plug. The thread plug is engaged with the internal thread. The resilient member is compressed between the stopping member and the thread plug.

In the foregoing, the main body has a first end and a second end opposite to each other. The first exhaust opening is located at the first end. The second exhaust opening is located on a sidewall of the main body and between the first end and the second end.

In the foregoing, the chamber further comprises an assembly opening. The assembly opening is adjacent to the second end. The hot melt apparatus further comprises a cap. The cap is detachable disposed at the second end and covers the assembly opening. The resilient member is compressed between the stopping member and the cap.

In summary, the exhaust pin that is able to slide relative to the main body is disposed in the main body of the hot melt apparatus, and the exhaust pin can close or open the exhaust opening located on the hot melt surface. When the hot melt process is performed by the hot melt apparatus through facing the hot melt surface with the plastic material, the pinhead of the exhaust pin will be pushed by the reaction force from the plastic material to close the exhaust opening so as to perform the hot melt process. When the hot melt surface is moved away from the formed hot melt head, the preload exerted on the exhaust pin by the resilient member disposed in the main body will push the exhaust pin to open the exhaust opening on the hot melt surface so as to achieve exhaust. As a result, the problem that the hot melt head curves up or falls off caused by the vacuum adsorption effect when the hot melt surface is moved away from the hot melt head in the prior art is resolved.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

In the following description, for purposes of explanation, numerous specific details are set forth as follows. However, it should be understood that such description is only to illustrate and not to limit the scope of the disclosure. It may be evident, in some embodiments of the disclosure, the claimed subject matter may be practiced without these specific details. In addition, known structures and components are depicted schematically to simplify the drawings.

Figure 1A:
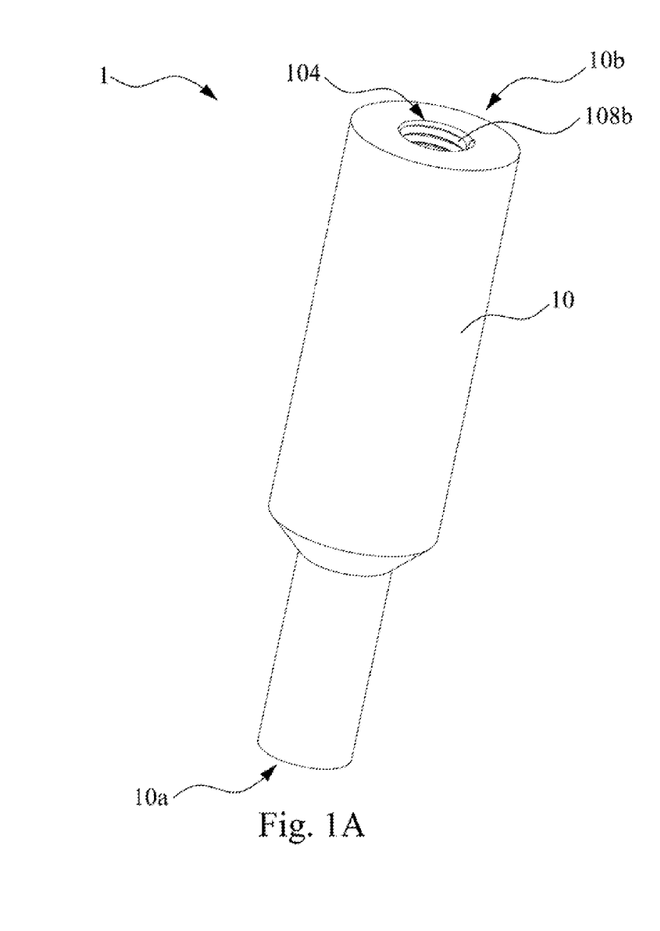
FIG. 1A depicts a perspective view of a hot melt apparatus according to one embodiment of this disclosure.
Figure 1B:
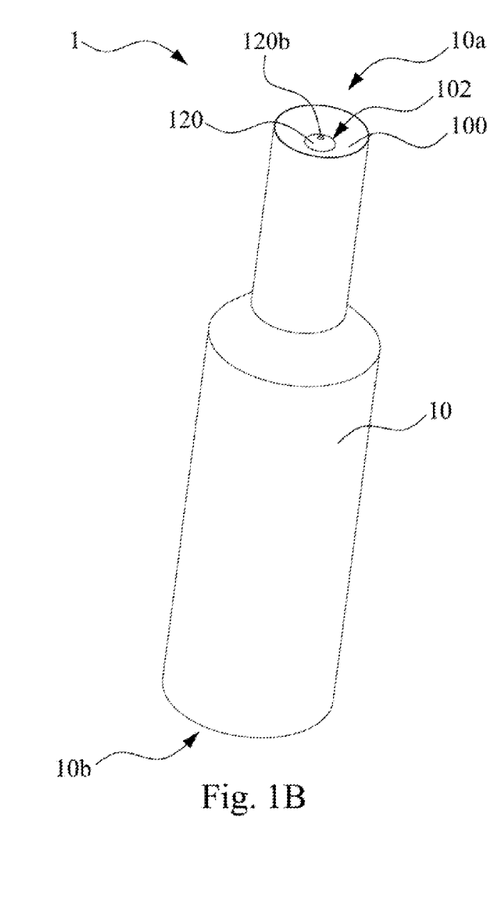
FIG. 1B depicts another perspective view of the hot melt apparatus in FIG. 1A.
Figure 2:
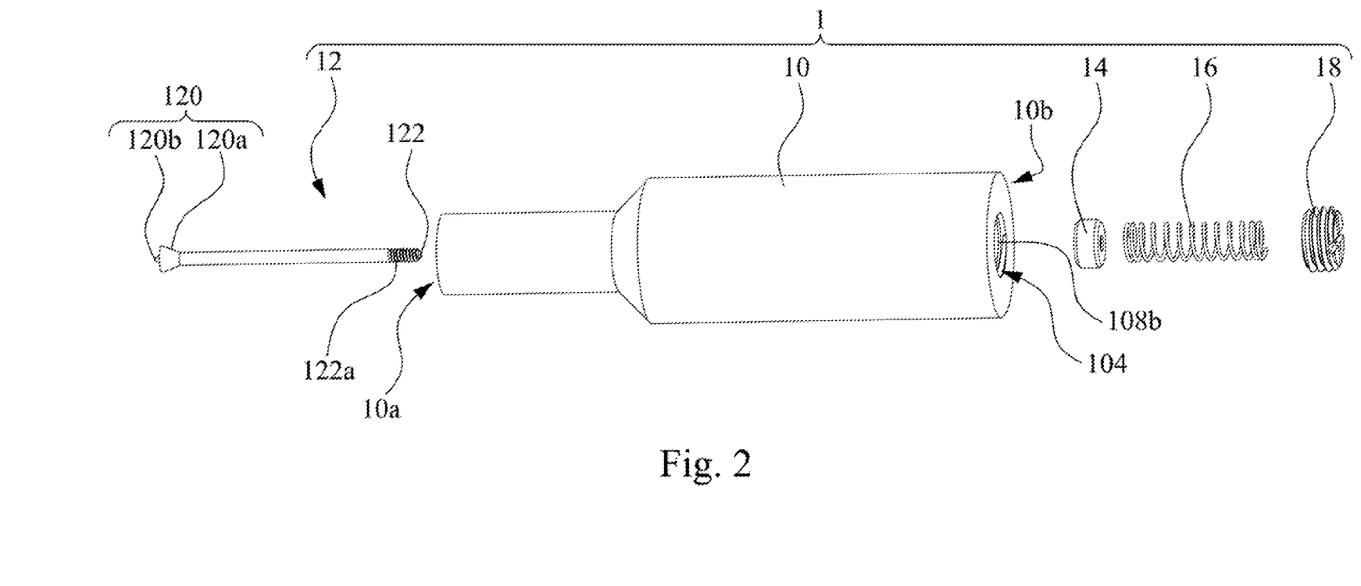
FIG. 2 depicts an exploded view of the hot melt apparatus in FIG. 1A.

FIG. 1A depicts a perspective view of a hot melt apparatus 1 according to one embodiment of this disclosure. FIG. 1B depicts another perspective view of the hot melt apparatus 1 in FIG. 1A. FIG. 2 depicts an exploded view of the hot melt apparatus 1 in FIG. 1A.

As shown in FIG. 1A to FIG. 2, the hot melt apparatus 1 comprises a main body 10, an exhaust pin 12, a stopping member 14, and a resilient member 16 according to the present embodiment. The main body 10 has a first end 10a and a second 10b opposite to each other. A shape of the main body 10 is substantially formed by connecting two cylinders having different diameters. A diameter of the main body 10 close to the first end 10a is smaller than a diameter of the main body 10 close to the second end 10b, but the present disclosure is not limited in this regard. The main body 10 of the hot melt apparatus 1 further comprises a hot melt surface 100, a first exhaust opening 102, and a second exhaust opening 104. The hot melt surface 100 of the main body 10 is located at the first end 10a. The first exhaust opening 102 of the main body 10 is located on the hot melt surface 100 (that is, the first exhaust opening 102 is also located at the first end 10a). The second exhaust opening 104 of the main body 10 is located at the second end 10b.

Figure 3:
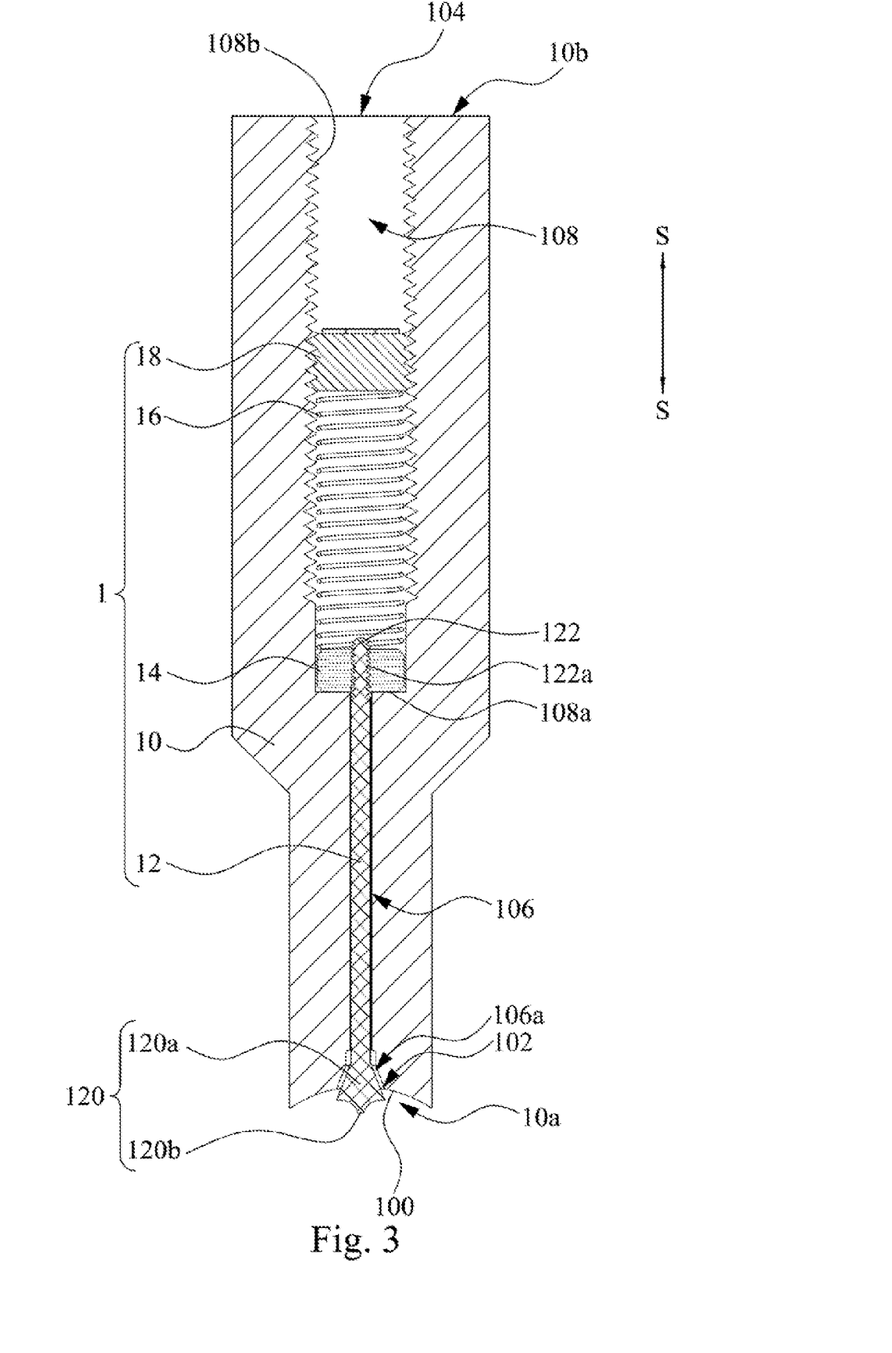
FIG. 3 depicts a cross-sectional view of the hot melt apparatus in FIG. 1A.

FIG. 3 depicts a cross-sectional view of the hot melt apparatus 1 in FIG. 1A.

As shown in FIG. 3, in the present embodiment, the main body 10 of the hot melt apparatus 1 further comprises a channel 106 and a chamber 108 inside the main body 10. The chamber 108 has an abutting surface 108a. Two ends of the channel 106 are respectively communicated with the first exhaust opening 102 and the abutting surface 108a of the chamber 108. The chamber 108 is communicated with the second exhaust opening 104. An inner diameter of the chamber 108 is greater than an inner diameter of the channel 106. In greater detail, the channel 106 and the chamber 108 are located between the first exhaust opening 102 and the second exhaust opening 104 (that is, the first exhaust opening 102, the channel 106, the chamber 108, and the second exhaust opening 104 are sequentially arranged in a line from the first end 10a to the second end 10b).

The exhaust pin 12 of the hot melt apparatus 1 may be slidably disposed in the channel 106 along a sliding direction S. The exhaust pin 12 has a pinhead 120 and a pintail 122. The pinhead 120 of the exhaust pin 12 protrudes out of the first exhaust opening 102 (that is, to protrude out of the hot melt surface 100 away from the second end 10b), and the pintail 122 protrudes into the chamber 108 (that is, to protrude out of the abutting surface 108a toward the second end 10b). The stopping member 14 of the hot melt apparatus 1 is accommodated in the chamber 108 and connected to the pintail 122. In greater detail, the stopping member 14 of the hot melt apparatus 1 may be a stop nut. The pintail 122 has an external thread 122a. The pintail 122 is passed through the stop nut and threaded into the stop nut by the external thread 122a, The resilient member 16 of the hot melt apparatus 1 is accommodated in the chamber 108 for pushing the stopping member 14 toward the abutting surface 108a of the chamber 108. However, the stopping member 14 of the present disclosure is not limited to the above stop nut. In another embodiment, the pintail 122 of the exhaust pin 12 and the stopping member 14 may be integrally formed, jointed by welding, or jointed by riveting.

In addition, the chamber 108 of the hot melt apparatus 1 further comprises an internal thread 108b. The internal thread 108b extends to the second exhaust opening 104. The hot melt apparatus 1 further comprises a thread plug 18. The thread plug 18 is placed into the chamber 108 through the second exhaust opening 104 and engaged with the internal thread 108b. The resilient member 16 of the hot melt apparatus 1 is compressed between the stopping member 14 and the thread plug 18. According to the present embodiment, a distance between the thread plug 18 and the stopping member 14 is adjusted by adjusting a depth for which the thread plug 18 is locked into the chamber 108 so as to adjust the elastic force exerted by the resilient member 16 on the stopping member 14 as required.

In the present embodiment, the resilient member 16 of the hot melt apparatus 1 is a compression spring, but the present disclosure is not limited in this regard.

Figure 4A:
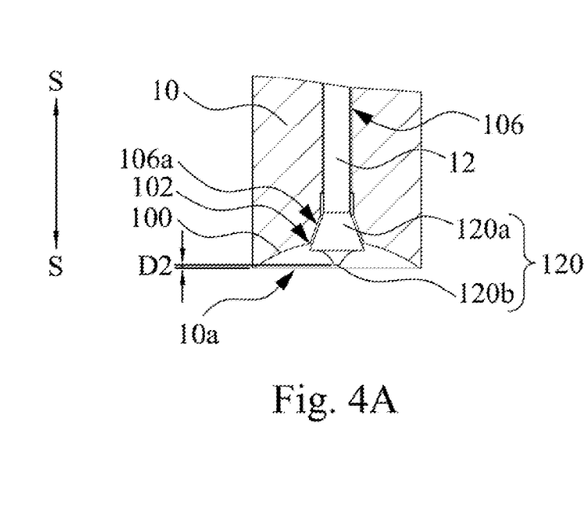
FIG. 4A depicts a partial cross-sectional view of the hot melt apparatus in FIG. 1A wherein the pinhead opens the first exhaust opening.
Figure 4B:
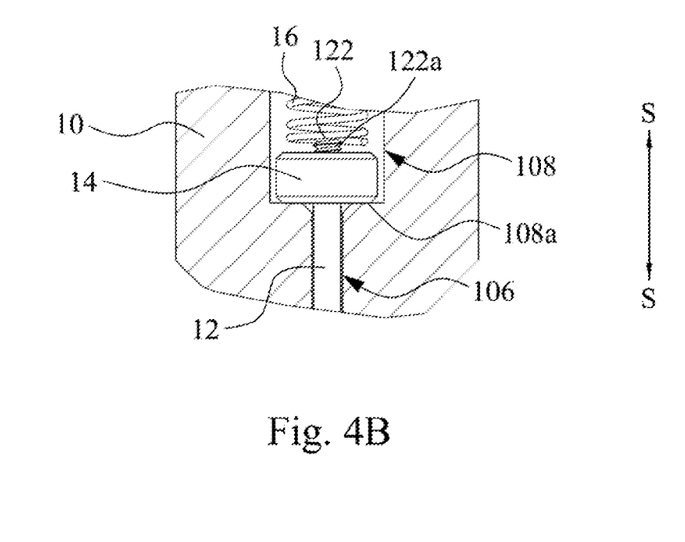
FIG. 4B depicts another cross-sectional view of the hot melt apparatus in FIG. 1A wherein the stopping member abuts against the abutting surface.
Figure 5A:
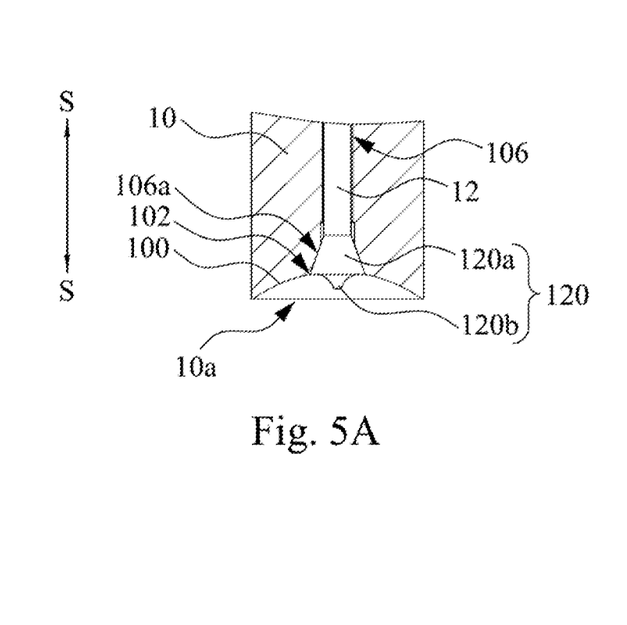
FIG. 5A depicts another partial cross-sectional view of the hot melt apparatus in FIG. 1A wherein the pinhead closes the first exhaust opening.
Figure 5B:
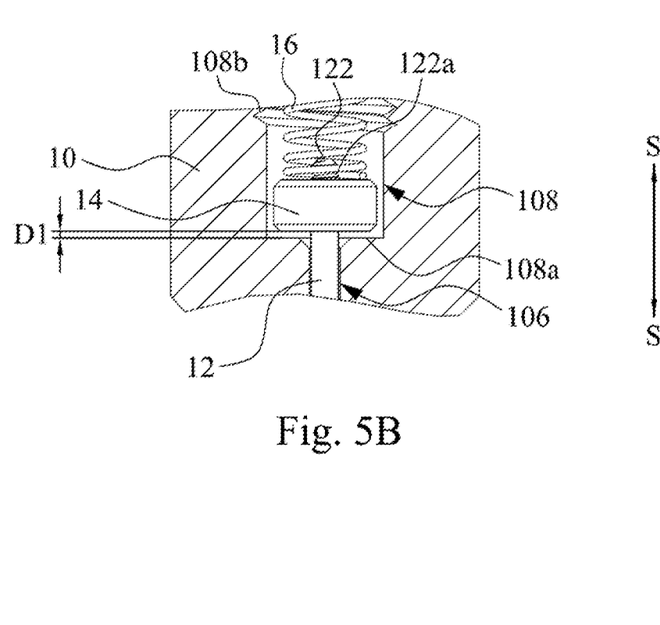
FIG. 5B depicts another cross-sectional view of the hot melt apparatus in FIG. 1A wherein the stopping member leaves the abutting surface.

FIG. 4A depicts a partial cross-sectional view of the hot melt apparatus 1 in FIG. 1A wherein the pinhead 120 opens the first exhaust opening 102. FIG. 4B depicts another cross-sectional view of the hot melt apparatus 1 in FIG. 1A wherein the stopping member 14 abuts against the abutting surface 108a. FIG. 5A depicts another partial cross-sectional view of the hot melt apparatus 1 in FIG. 1A wherein the pinhead 120 closes the first exhaust opening 102. FIG. 5B depicts another cross-sectional view of the hot melt apparatus 1 in FIG. 1A wherein the stopping member 14 leaves the abutting surface 108a.

According to the present embodiment, when the stopping member 14 of the hot melt apparatus 1 abuts against the abutting surface 108a of the chamber 108 (see FIG. 4B), the pinhead 120 of the exhaust pin 12 opens the first exhaust opening 102 (see FIG. 4A). In other words, a gap is formed between the pinhead 120 and the hot melt surface 100. Hence, air outside the hot melt apparatus 1 can enter and exist the channel 106 through the gap between the pinhead 120 and the hot melt surface 100. Conversely, when the pinhead 120 of the exhaust pin 12 closes the first exhaust opening 102 (see FIG. 5A), the stopping member 14 leaves the abutting surface 108a of the chamber 108 and compresses the resilient member 16 slightly (see FIG. 5B).

In greater detail, when the pinhead 120 of the exhaust pin 12 closes the first exhaust opening 102 (see FIG. 5A), the pinhead 120 and the hot melt surface 100 are smoothly connected. The hot melt surface 100 is substantially in a shape of an arc and recessed toward the second end 10b of the main body 10. Hence, when the hot melt surface 100 is faced with a plastic material by users (not shown in the figures) to perform the hot melt process, the molten plastic material will form a mushroom head shaped hot melt head.

As shown in FIG. 4A and FIG. 5A, in the present embodiment, the channel 106 of the main body 10 has a countersunk hole 106a. The countersunk hole 106a is adjacent to the first exhaust hole 102. The pinhead 120 of the exhaust pin 12 has a tapered portion 120a. A diameter of the tapered portion 120a gradually decreases toward the pintail 122 (that is, the tapered portion 120a is in a shape of a cone). A shape of the countersunk hole 106a conforms to the shape of the tapered portion 120a (that is, the countersunk hole 106a also has the shape of a cone). Hence, when the pinhead 120 of the exhaust pin 12 closes the first exhaust opening 102 the tapered portion 120a of the pinhead 120 can tightly close the countersunk hole 106a.

With additional reference to FIG. 5B, when the pinhead 120 of the exhaust pin 12 closes the first exhaust opening 102, a first distance D1 is formed between the stopping member 14 and the abutting surface 108a of the chamber 108 in the sliding direction S. According to the present embodiment, the first distance D1 is from 0.05 millimeter to 0.3 millimeter, but the present disclosure is not limited in this regard. In this manner, when the stopping member 14 of the hot melt apparatus 1 abuts against the abutting surface 108a of the chamber 108 so as to allow the pinhead 120 of the exhaust pin 12 to open the first exhaust opening 102 (see FIG. 4A), a size of the gap between the pinhead 120 and the hot melt surface 100 can be controlled within a proper range. As a result, both the problem that the plastic material enters into the channel 106 through the first exhaust opening 102 due to an excessive large gap size and the problem of unsmooth exhaust caused by an excessive small gap size will not occur.

In practical operation, users may perform the hot melt process through facing the hot melt surface 100 of the hot melt apparatus 1 with the plastic material according to the present embodiment. In this manner, the pinhead 120 of the exhaust pin 12 will be pushed by the reaction force from the plastic material to close the first exhaust opening 102 so as to perform the hot melt process. When the hot melt surface 100 is moved away from the formed hot melt head by users after the hot melting process is completed, a preload exerted on the stopping member 14 by the resilient member 16 disposed in the main body 10 will push the stopping member 14 to abut against the abutting surface 108a of the chamber 108. The pinhead 120 of the exhaust pin 12 thus opens the first exhaust opening 102 on the hot melt surface 100 to achieve exhaust. As a result, the problem that the hot melt head curves up or falls off caused by the vacuum adsorption effect when the hot melt surface 100 is moved away from the hot melt head in the prior art is resolved.

With additional reference to FIG. 5A, in the present embodiment, the pinhead 120 of the exhaust pin 12 further comprises a pin tip 120b extending away from the pintail 122. When the stopping member 14 abuts against the abutting surface 108a of the chamber 108, a second distance D2 is formed between the pin tip 120b and an outer edge of the hot melt surface 100 in the sliding direction S (see FIG. 4A). The second distance D2 is smaller than 0.3 millimeter, but the present disclosure is not limited in this regard. In this manner, when the hot melt surface 100 is faced with the plastic material by users to perform the hot melt process, the pin tip 120b of the pinhead 120 will contact the plastic material as early as possible to allow the pinhead 120 to be pushed before the plastic material completely fills up the hot melt surface 100. Hence, the first exhaust opening 102 is closed to ensure that the plastic material will not enter into the channel 106 through the first exhaust opening 102.

Figure 6A:
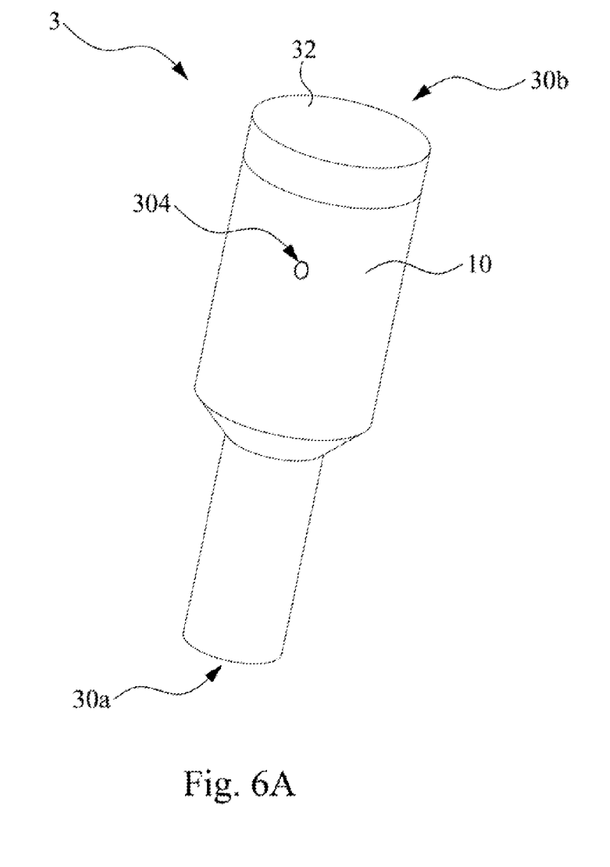
FIG. 6A depicts a perspective view of a hot melt apparatus according to another embodiment of this disclosure.
Figure 6B:
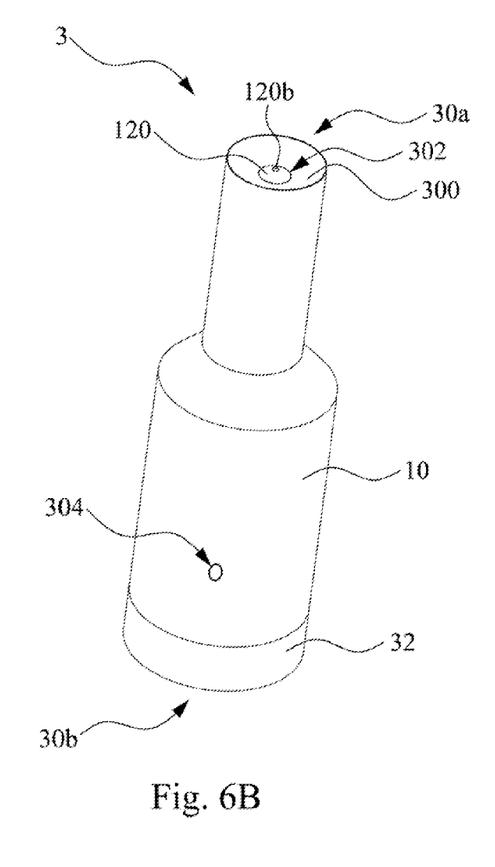
FIG. 6B depicts another perspective view of the hot melt apparatus in FIG. 6A.
Figure 7:
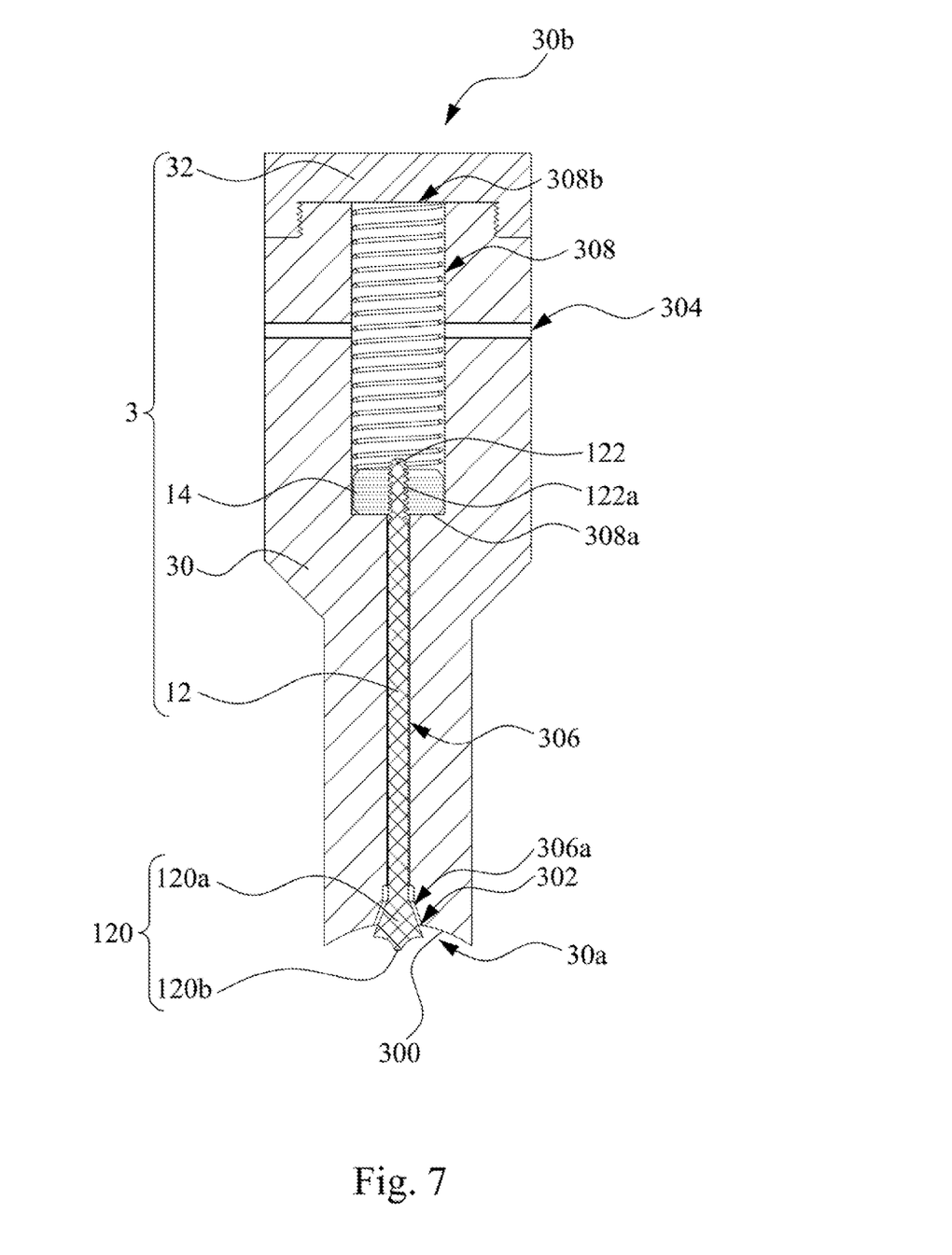
FIG. 7 depicts a cross-sectional view of the hot melt apparatus in FIG. 6A.

FIG. 6A depicts a perspective view of a hot melt apparatus 3 according to another embodiment of this disclosure. FIG. 6B depicts another perspective view of the hot melt apparatus 3 in FIG. 6A. FIG. 7 depicts across-sectional view of the hot melt apparatus 3 in FIG. 6A.

As shown in FIG. 6A to FIG. 7, the hot melt apparatus 3 comprises a main body 30, the exhaust pin 12, the stopping member 14, and the resilient member 16 according to the present embodiment. Since the exhaust pin 12, the stopping member 14, and the resilient member 16 in the present embodiment are the same as the exhaust pin 12, the stopping member 14, and the resilient member 16 of the embodiment shown in FIG. 1A to FIG. 5B, reference is made to the above corresponding description for the structures, functions, and relations of connections of the above-mentioned components and a description in this regard is not provided.

In the present embodiment, the main body 30 has a first end 30a and a second end 30b opposite to each other. The main body 30 of the hot melt apparatus 3 further comprises a hot melt surface 300, a first exhaust opening 302, and a second exhaust opening 304. The hot melt surface 300 of the main body 30 is located at the first end 30a. It is noted that the second exhaust opening 304 is located on a sidewall of the main body 30 and between the first end 30a and the second end 30b according to the present embodiment. The main body 30 of the hot melt apparatus 3 further comprises a channel 306 and a chamber 308 inside the main body 30. The chamber 308 has an abutting surface 308a that serves to be abutted by the stopping member 14. Two ends of the channel 306 are respectively communicated with the first exhaust opening 302 and the abutting surface 308a of the chamber 308. The chamber 308 is communicated with the second exhaust opening 304. In other words, only the first exhaust opening 302, the channel 306, and the chamber 308 are sequentially arranged in a line from the first end 30a to the second end 30b according to the present embodiment, and the second exhaust opening 304 exhausts air from the sidewall of the main body 30.

In addition, the chamber 308 further comprises an assembly opening 308b. The assembly opening 308b is adjacent to the second end 30b. The hot melt apparatus 3 further comprises a cap 32. The cap 32 is detachable disposed at the second end 30b and covers the assembly opening 308b. The resilient member 16 is compressed between the stopping member 14 and the cap 32. The stopping member 14 and the resilient member 16 are placed in the chamber 308 through assembling and disassembling the cap 32.

Based on the above description, it should be understood that the present embodiment differs from the embodiment shown in FIG. 1A to FIG. 5B in that the exhaust path of the main body 30 according to the present embodiment does not penetrate all the way from the first end 30a to the second end 30b. The thread plug 18 and the internal thread 108b of the chamber 108 shown in FIG. 3 are not needed so that both a length and a volume of the main body 30 are reduced.

In addition, reference is made to the above corresponding description for the embodiment shown in FIG. 1A to FIG. 5B for the structure of the hot melt surface 300 and the structure and function of a countersunk hole 306a of the channel 306 in the present embodiment, and a description in this regard is not provided.

According to the above detailed description of the embodiments of the present disclosure, it is apparent that the exhaust pin that is able to slide relative to the main body is disposed in the main body of the hot melt apparatus, and the exhaust pin can close or open the exhaust opening located on the hot melt surface. When the hot melt process is performed by the hot melt apparatus through facing the hot melt surface with the plastic material, the pinhead of the exhaust pin will be pushed by the reaction force from the plastic material to close the exhaust opening so as to perform the hot melt process. When the hot melt surface is moved away from the formed hot melt head, the preload exerted on the exhaust pin by the resilient member disposed in the main body will push the exhaust pin to open the exhaust opening on the hot melt surface so as to achieve exhaust. As a result, the problem that the hot melt head curves up or falls off caused by the vacuum adsorption effect when the hot melt surface is moved away from the hot melt head in the prior art is resolved.

Although the present disclosure has been described in considerable detail with reference to certain embodiments thereof, other embodiments are possible. Therefore, the spirit and scope of the appended claims should not be limited to the description of the embodiments contained herein.

It be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fail within the scope of the following claims.

What is claimed is:

1. A hot melt apparatus comprising:
a main body having a hot melt surface, a first exhaust opening, and a second exhaust opening, the first exhaust opening being located on the hot melt surface, the main body further comprising a channel and a chamber, the chamber having an abutting surface, the channel being communicated with the first exhaust opening and the abutting surface, and the chamber being communicated with the second exhaust opening;
an exhaust pin slidably disposed in the channel, the exhaust pin having a pinhead and a pintail, the pinhead protruding out of the first exhaust opening, the pintail protruding into the chamber;
a stopping member accommodated in the chamber and connected to the pintail, wherein when the stopping member abuts against the abutting surface, the pinhead opens the first exhaust opening, and when the pinhead closes the first exhaust opening, the stopping member leaves the abutting surface; and
a resilient member accommodated in the chamber for pushing the stopping member toward the abutting surface.

2. The hot melt apparatus of claim 1, wherein the main body has a first end and a second end opposite to each other, the first exhaust opening and the second exhaust opening are respectively located at the first end and the second end, and the channel and the chamber are located between the first exhaust opening and the second exhaust opening.

3. The hot melt apparatus of claim 2, wherein the stopping member is a stop nut, the pintail has an external thread, and the external thread is threaded into the stop nut.

4. The hot melt apparatus of claim 3, wherein when the pinhead closes the first exhaust opening, the pinhead and the hot melt surface are smoothly connected.

5. The hot melt apparatus of claim 4, wherein the hot melt surface is substantially in a shape of an arc and recessed toward the second end.

6. The hot melt apparatus of claim 5, wherein the exhaust pin slides relative to the channel along a sliding direction, when the pinhead closes the first exhaust opening, a first distance is formed between the stopping member and the abutting surface in the sliding direction, and the first distance is from 0.05 millimeter to 0.3 millimeter.

7. The hot melt apparatus of claim 6, wherein the pinhead has a pin tip extending away from the pintail, when the stopping member abuts against the abutting surface, a second distance is formed between the pin tip and an outer edge of the hot melt surface in the sliding direction, and the second distance is smaller than 0.3 millimeter.

8. The hot melt apparatus of claim 7, wherein the channel has a countersunk hole, the countersunk hole is adjacent to the first exhaust opening, the pinhead has a tapered portion, a diameter of the tapered portion gradually decreases toward the pintail, a shape of the countersunk hole conforms to a shape of the tapered portion, and when the pinhead closes the first exhaust opening, the tapered portion tightly closes the countersunk hole.

9. The hot melt apparatus of claim 8, wherein the chamber further comprises an internal thread extending to the second exhaust opening, the hot melt apparatus further comprises a thread plug, the thread plug is engaged with the internal thread, and the resilient member is compressed between the stopping member and the thread plug.

10. The hot melt apparatus of claim 1, wherein the main body has a first end and a second end opposite to each other, the first exhaust opening is located at the first end, and the second exhaust opening is located on a sidewall of the main body and between the first end and the second end.

11. The hot melt apparatus of claim 10, wherein the stopping member is a stop nut, the pintail has an external thread, and the external thread is threaded into the stop nut.

12. The hot melt apparatus of claim 11, wherein when the pinhead closes the first exhaust opening, the pinhead and the hot melt surface are smoothly connected.

13. The hot melt apparatus of claim 12, wherein the hot melt surface is substantially in a shape of an arc and recessed toward the second end.

14. The hot melt apparatus of claim 13, wherein the exhaust pin slides relative to the channel along a sliding direction, when the pinhead closes the first exhaust opening, a first distance is formed between the stopping member and the abutting surface in the sliding direction, and the first distance is from 0.05 millimeter to 0.3 millimeter.

15. The hot melt apparatus of claim 14, wherein the pinhead has a pin tip extending away from the pintail, when the stopping member abuts against the abutting surface, a second distance is formed between the pin tip and an outer edge of the hot melt surface in the sliding direction, and the second distance is smaller than 0.3 millimeter.

16. The hot melt apparatus of claim 15, wherein the channel has a countersunk hole, the countersunk hole is adjacent to the first exhaust opening, the pinhead has a tapered portion, a diameter of the tapered portion gradually decreases toward the pintail, a shape of the countersunk hole conforms to a shape of the tapered portion, and when the pinhead closes the first exhaust opening, the tapered portion tightly doses the countersunk hole.

17. The hot melt apparatus of claim 16, wherein the chamber further comprises an assembly opening, the assembly opening is adjacent to the second end, the hot melt apparatus further comprises a cap, the cap is detachable disposed at the second end and covers the assembly opening, and the resilient member is compressed between the stopping member and the cap.

* * * * *